USO08903119B2

(12) United States Patent
Dedeoglu et al.

(10) Patent No.: US 8,903,119 B2
(45) Date of Patent: Dec. 2, 2014

(54) USE OF THREE-DIMENSIONAL TOP-DOWN VIEWS FOR BUSINESS ANALYTICS

(75) Inventors: Goksel Dedeoglu, Plano, TX (US); Vinay Sharma, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 311 days.

(21) Appl. No.: 13/270,993

(22) Filed: Oct. 11, 2011

(65) Prior Publication Data

US 2012/0087572 A1 Apr. 12, 2012

Related U.S. Application Data

(60) Provisional application No. 61/391,947, filed on Oct. 11, 2010.

(51) Int. Cl.
*G06K 9/00* (2006.01)
(52) U.S. Cl.
CPC ................... *G06K 9/00771* (2013.01)
USPC ............................ 382/100; 382/154; 382/106
(58) Field of Classification Search
CPC ....... G06T 7/602; G06T 11/00; G06T 1/0007; G06K 9/46
USPC .......................................... 382/100, 154, 106
See application file for complete search history.

(56) References Cited

U.S. PATENT DOCUMENTS

| 7,688,349 | B2 | 3/2010 | Flickner et al. | |
|---|---|---|---|---|
| 2004/0153671 | A1* | 8/2004 | Schuyler et al. | 713/201 |
| 2005/0129305 | A1* | 6/2005 | Chen et al. | 382/154 |
| 2006/0139314 | A1* | 6/2006 | Bell | 345/156 |
| 2011/0228984 | A1 | 9/2011 | Papke et al. | |
| 2011/0231419 | A1 | 9/2011 | Papke et al. | |

OTHER PUBLICATIONS

J. Salas and C. Tomasi, "People Detection Using Color and Depth Images", Mexican Conference on Pattern Recognition, pp. 127-135, Jun. 2011.
M. Harville, et al, "Foreground Segmentation Using Adaptive Mixture Models in Color and Depth", Proceedings of IEEE Workshop on Detection and Recognition of Events in Video, pp. 3-11, Jul. 2001.
C. Eveland, et al, "Background Modeling for Segmentation of Video-Rate Stereo Sequences", Proceedings of IEEE Computer Vision and Pattern Recognition, pp. 266-271, Jun. 1998.
"Equinox Overview, Visual Intelligence Systems", LHL08-0022, Rev .1.5, LightHaus Logic Inc., pp. 1-2, 2009.
"Equinox Advanced Analytics, Business Intelligence", LHL09-0042, Rev. 1.1, LightHaus Logic Inc., pp. 1-2, 2009.
"Equnox Retail Solutions, Business Intelligence for Customer Centricity and Operational Efficiency", LHL08-0095, Rev. 1.3, LightHaus Logic Inc., pp. 1-2, 2009.
"Expanding the Business Relevance of Video Surveillance in Retail", Solution Brief, 1209/DAL/OCG/XX/PDF, Intel Corporation, pp. 1-4, 2009.
I. Haritaoglu, et al, "W4: Real-Time Surveillance of People and Their Activities", IEEE Transactions on Pattern Analysis and Machine Intelligence, vol. 22, No. 8, pp. 809-830, Aug. 2000.

* cited by examiner

*Primary Examiner* — Mike Rahmjoo
(74) *Attorney, Agent, or Firm* — Frederick J. Telecky, Jr.; Wade J. Brady, III

(57) ABSTRACT

A method of analyzing a depth image in a digital system is provided that includes detecting a foreground object in a depth image, wherein the depth image is a top-down perspective of a scene, and performing data extraction and classification on the foreground object using depth information in the depth image.

6 Claims, 6 Drawing Sheets

USE OF THREE-DIMENSIONAL TOP-DOWN VIEWS FOR BUSINESS ANALYTICS

CROSS-REFERENCE TO RELATED APPLICATIONS

This application claims benefit of U.S. Provisional Patent Application Ser. No. 61/391,947, filed Oct. 11, 2010, which is incorporated by reference herein in its entirety.

BACKGROUND OF THE INVENTION

1. Field of the Invention

Embodiments of the present invention generally relate to using three-dimensional top-down views, i.e., top-down depth images, for business analytics.

2. Description of the Related Art

Retail businesses are interested in using cameras to extract business intelligence information regarding customer demographics and customer behavior. For example, information regarding customer traffic patterns, line lengths, dwell time, gender, age, etc. may be determined from video captured by strategically placed cameras. The extraction of business intelligence information from video images may be referred to as business analytics or video business analytics. Current tools for business analytics analyze two-dimensional (2D) video streams to extract such information.

SUMMARY

Embodiments of the present invention relate to methods for analyzing depth images captured from a top-down perspective to extract relevant business intelligence information. In one aspect, a method of analyzing a depth image in a digital system includes detecting a foreground object in a depth image, wherein the depth image is a top-down perspective of a scene, and performing data extraction and classification on the foreground object using depth information in the depth image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1A:
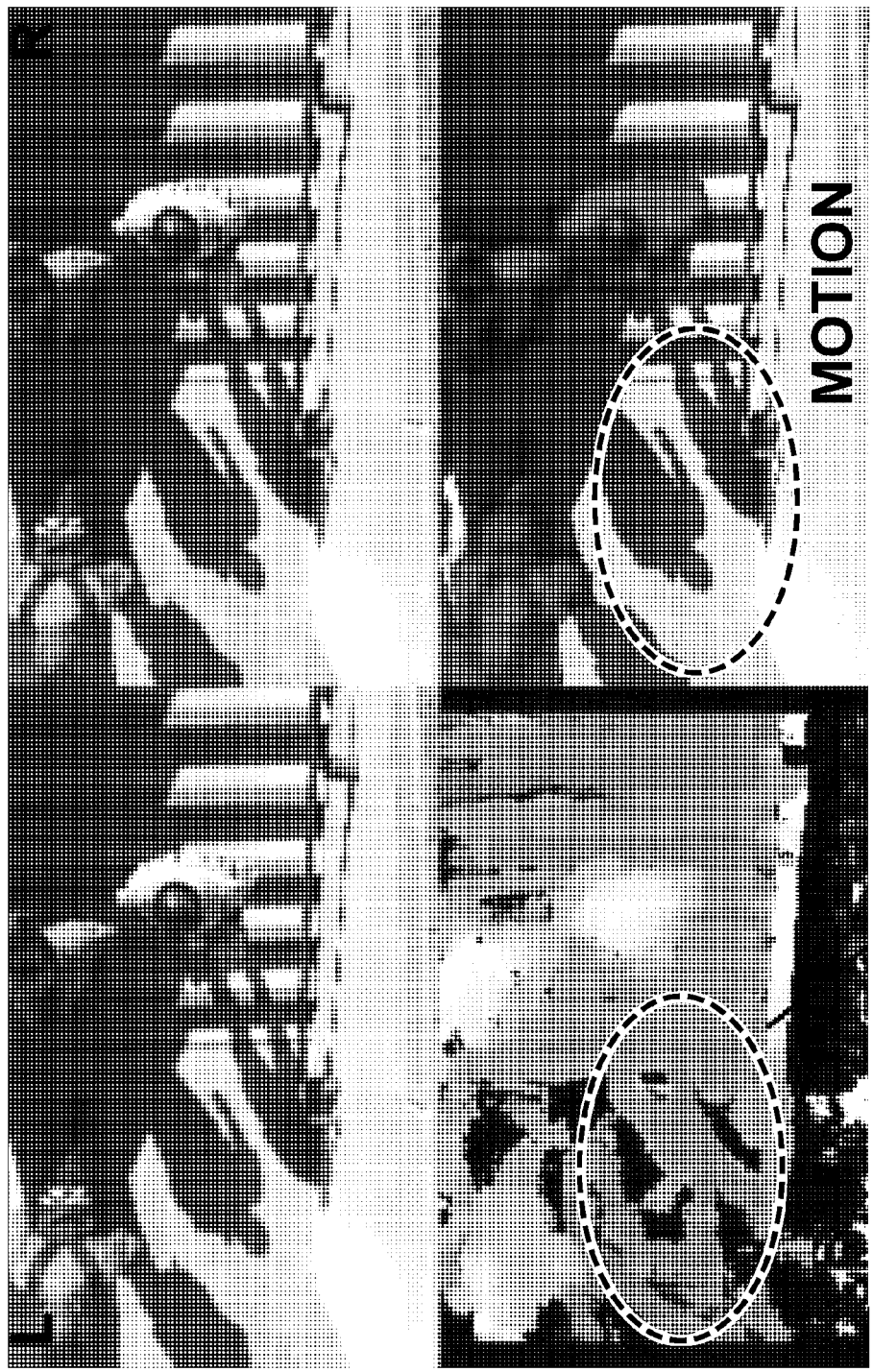
FIGS. 1A, 1B, and 2 are examples.

Specific embodiments of the invention will now be described in detail with reference to the accompanying figures. Like elements in the various figures are denoted by like reference numerals for consistency.

As was previously mentioned, current tools for video business analytics operate on 2D video streams. Current techniques for analysis of 2D images may not be accurate in some aspects. For example, it is difficult for such techniques to discern distinct individuals when two or more people are close together or to recognize that shadows or reflections are not people. Embodiments of the invention perform video business analytics using three-dimensional (3D) depth imagery captured from a top-down perspective, i.e., with a depth camera mounted so as to capture a scene from the top. The use of such depth images may provide improved analysis precision and also allow for additional and/or more precise customer demographic information. For example, depth-based analysis may provide more precise segmentation of images into categories such as people vs. shopping carts/strollers/pets, and may permit direct measurement of physical characteristics such as height and girth, leading to age profiling in a more robust manner.

FIG. 1A shows an example of using an outdoor stereoscopic video camera looking down at a staircase. A stereoscopic video camera is one example of a depth video camera. The top images are, respectively, the left image and the right image captured by the camera. The bottom left image is the depth image (shown with false color) determined from the left image and the right image. The bottom right image is the output display of a sample application that used depth for motion detection. This image illustrates that analysis of depth images will likely not be "fooled" by shadows and other illumination artifacts. This image is composed by coloring those pixels in the left image that were deemed to be moving by the application. As can be seen from these images, the bodies of the people in the scene cause clearly observable peaks (indicated by the three lighter colored areas) in the depth image, facilitating high accuracy head counts that are not likely to be corrupted by illumination artifacts such as cast shadows (indicated by the dotted oval). A simple comparison to a background depth model of the scene will provide precise segmentation of people using the staircase.

Figure 1B:
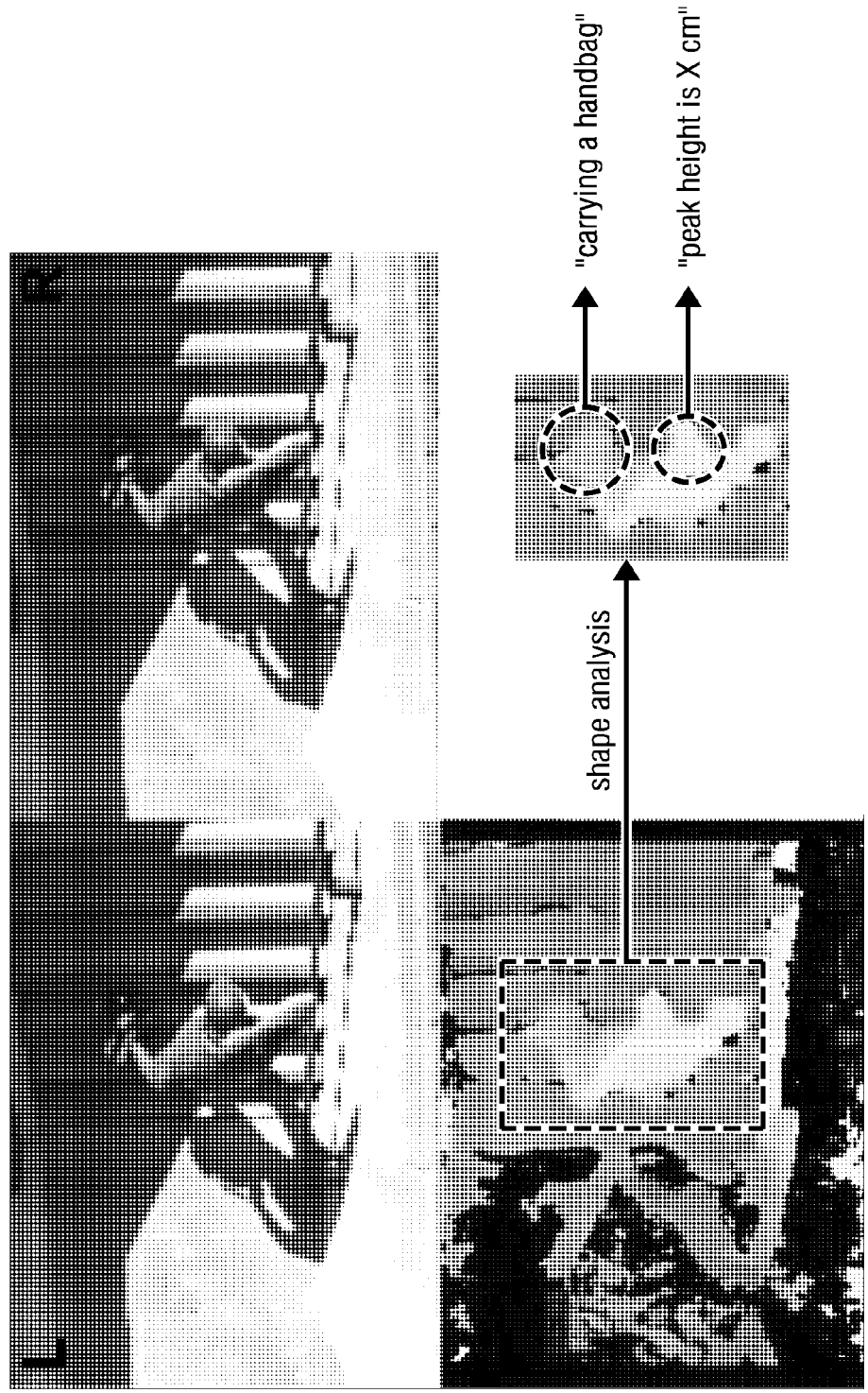

FIG. 1B is another example of using the outdoor stereoscopic video camera looking down at the staircase. In this example, a person carrying a handbag is on the staircase. As in FIG. 1A, the top images are, respectively, the left image and the right image captured by the camera and the bottom left image is the depth image (shown with false color) determined from the left image and the right image. The area in the depth image corresponding to the person, i.e., the foreground blob corresponding to the person, is enclosed in the dashed rectangle. Shape analysis can be performed on this blob using the depth information to determine that the blob is a person and that the blob is carrying something at waist height and to the left. Further, the peak of the blob can be used to determine the height of the person.

Figure 2:
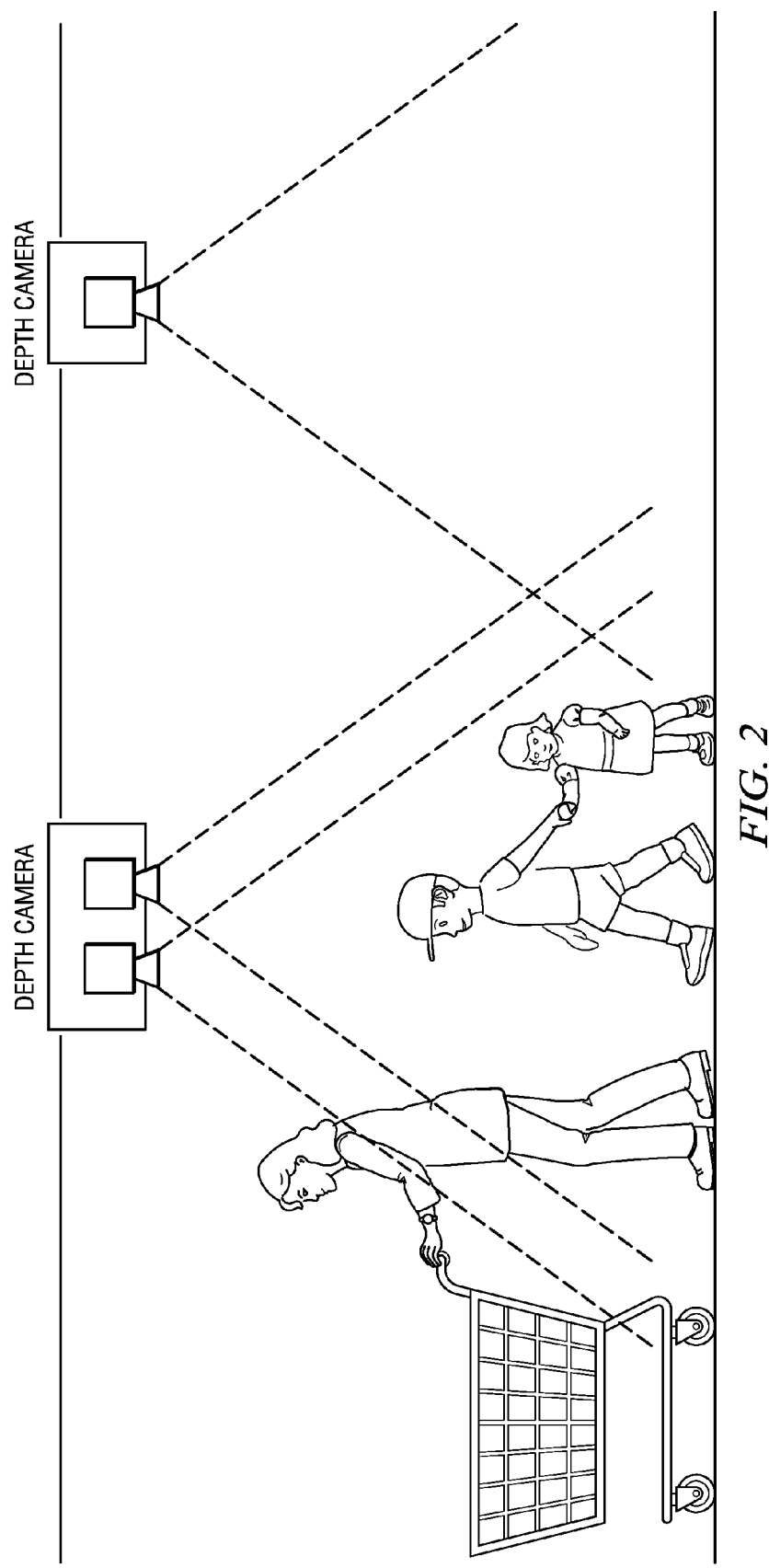

FIG. 2 is an example illustrating the positioning of video depth cameras to capture top-down images of a scene. For this particular example, a scene in a retail store where shopping carts are used is assumed. Note that the depth cameras are positioned above the scene with the imaging sensor(s) in the cameras pointed downward in order to capture the scene from the top. As will be understood from the description herein, the analysis of the resulting depth images will be able to discern that there are three people in the scene despite the close proximity of two of the people and that one of the people is pushing a shopping cart. The heights of each of the people will also be discernible as will the information that two of the people are holding hands. From the height information, the person pushing the shopping cart may be classified as an adult and the other two people may be classified as children.

Figure 3:
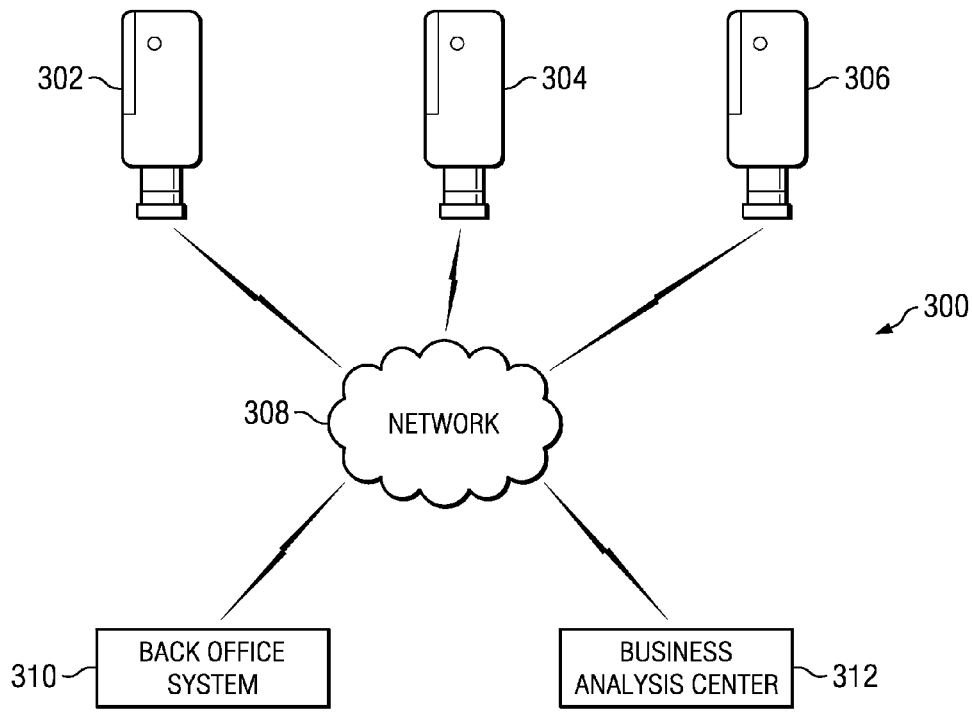
FIG. 3 is a block diagram of a business analytics system.

FIG. 3 is a block diagram of a simple example of a business intelligence system 300 configured to perform video business analytics as described herein. The business intelligence system 300 includes three video cameras 302, 304, 306, a back office system 310, and a business analysis center 312 connected via a network 308. More specifically, the video cameras 302, 304, 306 communicate with the back office system 310 via the network 308, and the back office system communicates with the business analysis center 312 via the network 308. The back office system 310 and the business analysis center 312 may include one or more computers such as the computer of FIG. 5. In general, the back office system 310 is on site in a retail establishment and includes functionality to collect and transmit data regarding operation of the retail establishment to the business analysis center 312. The back office system 310 may also include functionality to use some of the collected data in the operation of the retail establishment, e.g., to generate alerts when certain conditions occur. In general, the business analysis center 312 includes functionality to analyze the collected data from the back office system 310 to derive business intelligence from the data that may be used to improve operations in the retail establishment. The network 308 may be any communication medium, or combination of communication media, such as, for example, wired or wireless communication media, a local area network, or a wide area network.

Three cameras are shown for illustrative purposes. More or fewer cameras may be used. Each of the cameras 302, 304, 308 includes functionality to capture depth images of a scene. For purposes of this example, the cameras 302, 304, 308 are assumed to be deployed in a retail environment and are deployed in locations where people are expected to be present. For example, cameras may be deployed over doorways, aisles, counters, point-of-sale locations, etc. Further, each camera 302, 304, 308 is positioned to capture top-down depth images of a scene.

A depth image, which may also be referred to as a 3D image, is a two-dimensional array where the x and y coordinates correspond to the rows and columns of the pixel array as in a 2D image, and the corresponding depth values (z values) of the pixels are stored in the array's elements. The depth values are distance measurements from the camera to the corresponding surface points on objects in the scene.

A camera with functionality to capture depth images of a scene may be referred to as a 3D camera or depth camera. Examples of depth cameras include stereoscopic cameras, structured light cameras, and time-of-flight (TOF) cameras. Other 3D imaging technology may also be used. In general, a stereoscopic camera performs stereo imaging in which 2D images from two (or more) passive image sensors are used to determine a depth image from disparity measurements between the 2D images. In general, a structured light camera projects a known pattern of light onto a scene and analyzes the deformation of the pattern from striking the surfaces of objects in the scene to determine depth. In general, a TOF camera emits light pulses into the scene and measures the time between an emitted light pulse and the corresponding incoming light pulse to determine scene depth. Depth cameras such as structured light camera and TOF cameras may also include additional imaging sensors to generate a 2D grayscale or color image of the scene in addition to the depth image.

The business intelligence system 300 includes functionality to perform methods for analysis of depth images captured by the depth cameras 302, 304, 306 as described herein. Where the analysis is performed depends on the processing capabilities of the depth cameras 302, 304, 306. For example, if a depth camera is suitably configured to perform video analytics such as the camera of FIG. 4, the depth image analysis may be performed in the camera and the resulting data transmitted to the back office system 310. If a depth camera does not included video analytic capability, the depth camera may transmit the captured depth images to a computer system such as the computer system of FIG. 5 that will perform the depth image analysis. Further, the analysis may be split between a depth camera and the back office system 310.

Figure 4:
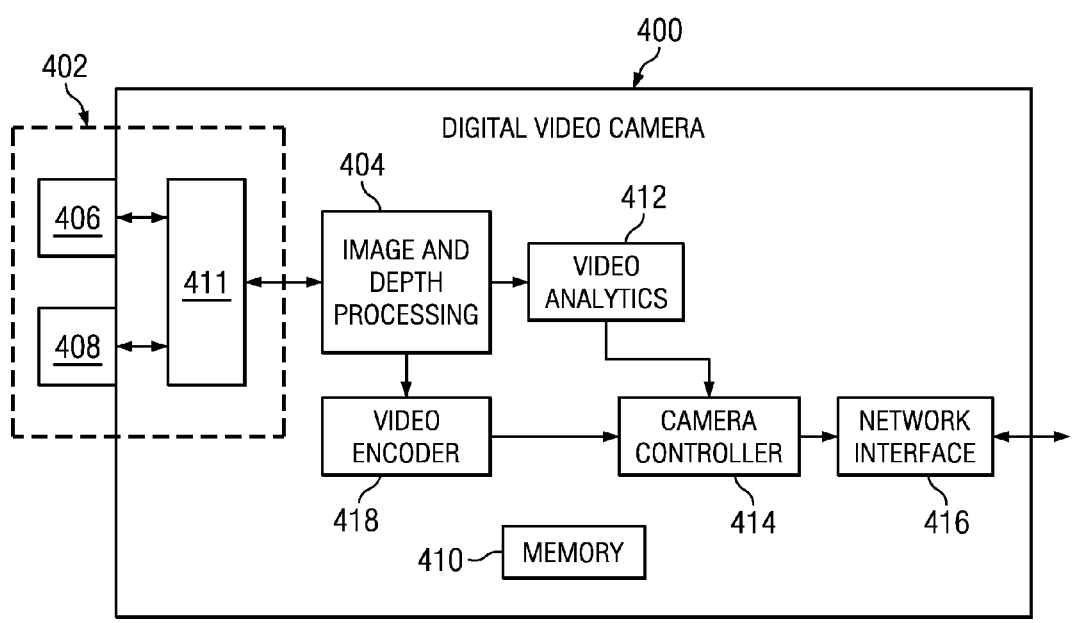
FIG. 4 is a block diagram of a digital video depth camera.

FIG. 4 is a block diagram of an example digital video depth camera 400 that may be used for video business analytics, e.g., in the business intelligence system of FIG. 3. The depth camera 400 includes a 3D imaging system 402, an image and depth processing component 404, a video encoder component 418, a memory component 410, a video analytics component 412, a camera controller 414, and a network interface 416. The components of the depth camera 400 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 410 and executed by one or more processors.

The 3D imaging system 402 includes two imaging components 406, 408 and a controller component 411 for capturing the data needed to generate a depth image. The imaging components 406, 408 and the functionality of the controller component 411 vary depending on the 3D imaging technology implemented. For example, for a stereoscopic camera, the imaging components 406, 408 are imaging sensor systems arranged to capture image signals of a scene from a left viewpoint and a right viewpoint. That is, one imaging sensor system 406 is arranged to capture an image signal from the left viewpoint, i.e., a left analog image signal, and the other imaging sensor system 408 is arranged to capture an image signal from the right view point, i.e., a right analog image signal. Each of the imaging sensor subsystems 406, 408 includes a lens assembly, a lens actuator, an aperture, and an imaging sensor. The 3D imaging system 402 also includes circuitry for controlling various aspects of the operation of the system, such as, for example, aperture opening amount, exposure time, etc. The controller module 411 includes functionality to convey control information from the camera controller 414 to the imaging sensor systems 406, 408, to convert the left and right analog image signals to left and right digital image signals, and to provide the left and right digital image signals to the image and depth processing component 404.

For a TOF camera or a structured light camera, the imaging component 406 is an imaging sensor system arranged to capture image signals of a scene as previously described and the imaging component 408 is an illumination unit arranged to project light, e.g., infrared light, into the scene. The imaging sensor system 406 may also include an optical filter that matches the optical frequency of the light projected by the illumination unit 408. The 3D imaging system 402 also includes circuitry for controlling various aspects of the operation of the system, such as, for example, aperture opening amount, exposure time, synchronization of the imaging sensor system 406 and the illumination unit 408, etc. In a TOF camera, each pixel captured by the imaging sensor system 406 measures the time the light from the illumination unit 408 to surfaces in the scene and back. In a structured light camera, the pixels captured by the imaging sensor system 406 capture the deformation on surfaces in the scene of a pattern of light projected by the illumination unit 408. The controller module 411 includes functionality to convey control information from the camera controller 414 to the imaging sensor system 406 and the illumination unit 408, to convert the image signals from the imaging sensor system 406 to digital image signals, and to provide the digital image signals to the image and depth processing component 404.

The image and depth processing component 404 divides the incoming digital signal(s) into frames of pixels and processes each frame to enhance the image data in the frame. The processing performed may include one or more image enhancement techniques according to imaging technology used to capture the pixel data. For example, for stereoscopic imaging, the image and depth processing component 404 may perform one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right images. The same enhancement techniques may also be applied to the images captured by a structured light camera. Enhancement techniques for images captured by a TOF camera may include faulty pixel correction and denoising.

The image and depth processing component 404 then uses the enhanced image data to generate a depth image. Any suitable algorithm may be used to generate the depth image from the enhanced image data. The depth images are provided to the video encoder component 408 and the video analytics component 412. If the camera 400 is a stereoscopic camera, the left and right 2D images are also provided to the video analytics component 412 and the video encoder component 408. If the camera 400 is a structured-light or time-of-flight camera that includes a human-viewable imaging sensor, that 2D image is also provided to the video analytics component 412 and the video encoder component 408.

The video encoder component 408 encodes the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 410 may be on-chip memory, external memory, or a combination thereof. Any suitable memory design may be used. For example, the memory component 410 may include static random access memory (SRAM), dynamic random access memory (DRAM), synchronous DRAM (SDRAM), read-only memory (ROM), flash memory, a combination thereof, or the like. Various components in the digital video camera 400 may store information in memory in the memory component 410 as a video stream is processed. For example, the video encoder component 408 may store reference data in a memory of the memory component 410 for use in encoding frames in the video stream. Further, the memory component 410 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 400. In some cases, the software instructions may also be sold in a computer program product, which includes the computer-readable medium and packaging materials for the computer-readable medium. In some cases, the software instructions may be distributed to the digital video camera 400 via removable computer readable media (e.g., floppy disk, optical disk, flash memory, USB key), via a transmission path from computer readable media on another computer system (e.g., a server), etc.

The camera controller component 414 controls the overall functioning of the digital video camera 400. For example, the camera controller component 414 may adjust the focus and/or exposure of the 3D imaging system 402 based on the focus quality and scene brightness, respectively, determined by the image and depth processing component 404. The camera controller component 414 also controls the transmission of the encoded video stream via the network interface component 416 and may control reception and response to camera control information received via the network interface component 416. Further, the camera controller component 414 controls the transfer of alerts and other information from the video analytics component 412 via the network interface component 416.

The network interface component 416 allows the digital video camera 400 to communicate with a monitoring system. The network interface component 416 may provide an interface for a wired connection, e.g., an Ethernet cable or the like, and/or for a wireless connection. The network interface component 416 may use any suitable network protocol(s).

The video analytics component 412 analyzes the content of depth images in the captured video stream to detect and determine temporal events not based on a single image. The analysis capabilities of the video analytics component 412 may vary in embodiments depending on such factors as the processing capability of the digital video camera 400, the particular application for which the digital video camera is being used, etc. For example, the analysis capabilities may range from video motion detection in which motion is detected with respect to a fixed background model to people counting, detection of objects crossing lines or areas of interest, object tracking, automatically analyzing and tagging suspicious objects in a scene, activating alarms or taking other actions to alert security personnel, etc. The analysis capabilities of the video analytics component 412 may include performing methods for depth image analysis as described herein.

Figure 5:
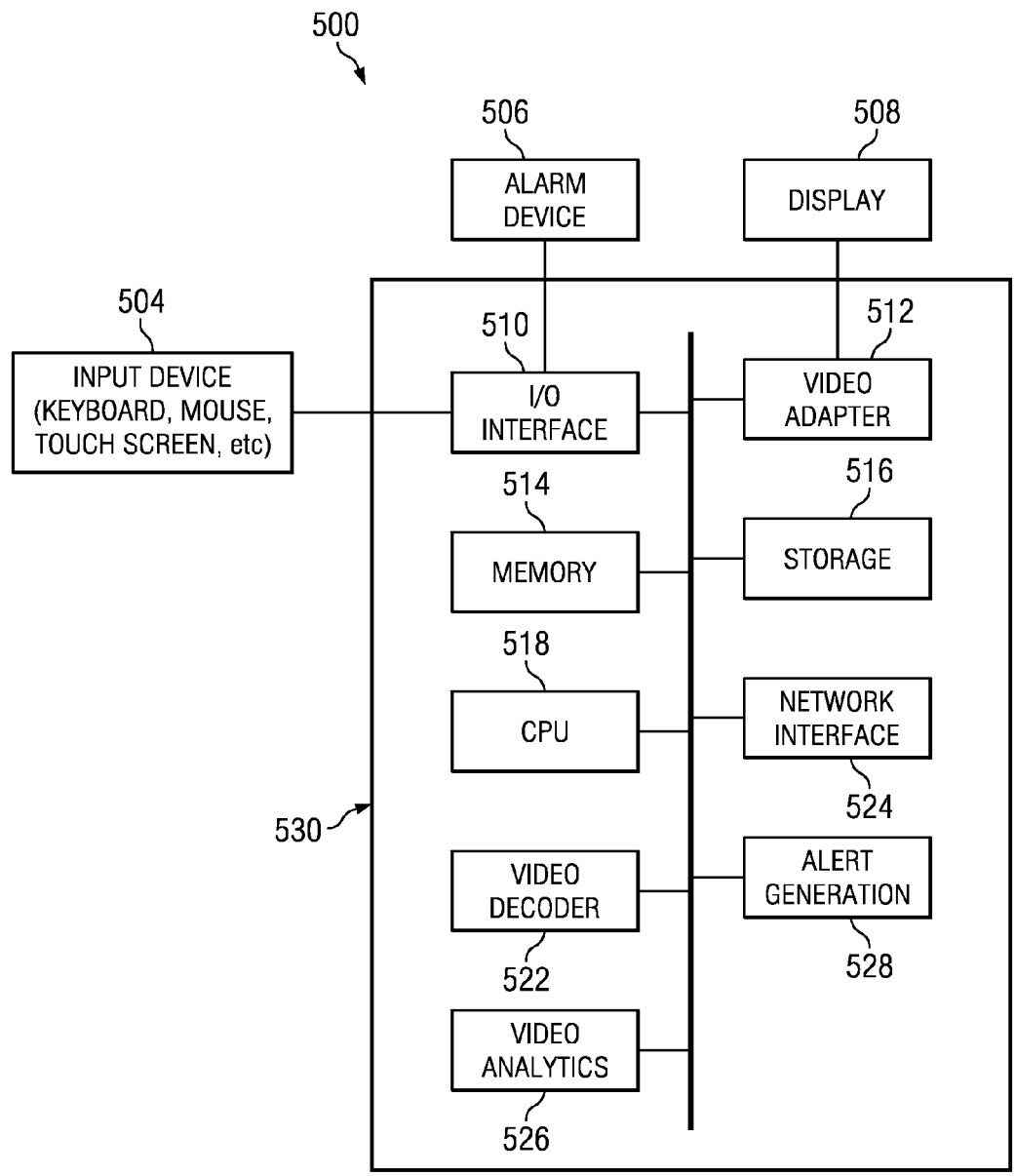
FIG. 5 is a block diagram of a computer.

FIG. 5 is a block diagram of a computer system 500 in accordance with one or more embodiments. The computer system 500 may be used in a business intelligence system as, for example, a computer system in the back office server 310 or as a computer system in the business analysis center 312. The computer system 500 includes a processing unit 530 equipped with one or more input devices 504 (e.g., a mouse, a keyboard, or the like), and one or more output devices, such as a display 508, or the like. In some embodiments, the computer system 500 also includes an alarm device 506. In some embodiments, the display 508 may be touch screen, thus allowing the display 508 to also function as an input device. The processing unit 530 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, or a combination thereof.

The processing unit 530 includes a central processing unit (CPU) 518, memory 514, a storage device 516, a video adapter 512, an I/O interface 510, a video decoder 522, and a network interface 524 connected to a bus. In some embodiments, the processing unit 530 may include one or more of a video analytics component 526 and an alarm generation component 528 connected to the bus. The bus may be one or more of any type of several bus architectures including a memory bus or memory controller, a peripheral bus, video bus, or the like.

The CPU 518 may be any type of electronic data processor. For example, the CPU 518 may be a processor from Intel Corp., a processor from Advanced Micro Devices, Inc., a Reduced Instruction Set Computer (RISC), an Application-Specific Integrated Circuit (ASIC), or the like. The memory 514 may be any type of system memory such as static random access memory (SRAM), dynamic random access memory (DRAM), synchronous DRAM (SDRAM), read-only memory (ROM), flash memory, a combination thereof, or the like. Further, the memory 514 may include ROM for use at boot-up, and DRAM for data storage for use while executing programs.

The storage device 516 (e.g., a computer readable medium) may comprise any type of storage device configured to store data, programs, and other information and to make the data, programs, and other information accessible via the bus. In one or more embodiments, the storage device 516 stores software instructions that, when executed by the CPU 518, cause the processing unit 530 to monitor one or more digital video cameras being used for surveillance. The storage device 516 may be, for example, one or more of a hard disk drive, a magnetic disk drive, an optical disk drive, or the like.

The software instructions may be initially stored in a computer-readable medium such as a compact disc (CD), a diskette, a tape, a file, memory, or any other computer readable storage device and loaded and executed by the CPU 518. In some cases, the software instructions may also be sold in a computer program product, which includes the computer-readable medium and packaging materials for the computer-readable medium. In some cases, the software instructions may be distributed to the computer system 500 via removable computer readable media (e.g., floppy disk, optical disk, flash memory, USB key), via a transmission path from computer readable media on another computer system (e.g., a server), etc.

The video adapter 512 and the I/O interface 510 provide interfaces to couple external input and output devices to the processing unit 530. As illustrated in FIG. 5, examples of input and output devices include the display 508 coupled to the video adapter 512 and the mouse/keyboard 504 and the alarm device 506 coupled to the I/O interface 510.

The network interface 524 allows the processing unit 530 to communicate with remote units via a network (not shown). In one or more embodiments, the network interface 524 allows the computer system 500 to communicate via a network to one or more video depth cameras to receive encoded video sequences and other information transmitted by the depth camera(s). The network interface 524 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 510 may also include other components not specifically shown. For example, the computer system 510 may include power supplies, cables, a motherboard, removable storage media, cases, and the like.

The video decoder component 522 decodes frames in an encoded video sequence received from a depth camera in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc. The decoded frames may be provided to the video adapter 512 for display on the display 508. In embodiments including the video analytics component 526, the video decoder component 522 also provides the decoded frames to this component.

The video analytics component 526 analyzes the content of frames of the decoded video stream to detect and determine temporal events not based on a single frame. The analysis capabilities of the video analytics component 526 may vary in embodiments depending on such factors as the processing capability of the processing unit 530, the processing capability of digital video cameras transmitting encoded video sequences to the computer system 500, the particular application for which the digital video cameras are being used, etc. For example, the analysis capabilities may range from video motion detection in which motion is detected with respect to a fixed background model to people counting, detection of objects crossing lines or areas of interest, object tracking, automatically analyzing and tagging suspicious objects in a scene, activating alarms or taking other actions to alert appropriate personnel, etc. The analysis capabilities of the video analytics component 526 may include performing methods for depth image analysis as described herein.

The alert generation component 528 may receive alert data from a surveillance camera via the network interface 524 and/or the video analytics component 526 and performs actions to notify monitoring personnel of alerts. The actions to be taken may be user-configurable and may differ according to the type of the alert signal. For example, the alert generation component 528 may cause a visual cue to be displayed on the display 508 for less critical alerts and may generate an audio and/or visual alarm via the alarm device 506 for more critical alerts. The alert generation component 528 may also cause notifications of alerts to be sent to monitoring personnel via email, a text message, a phone call, etc.

Figure 6:
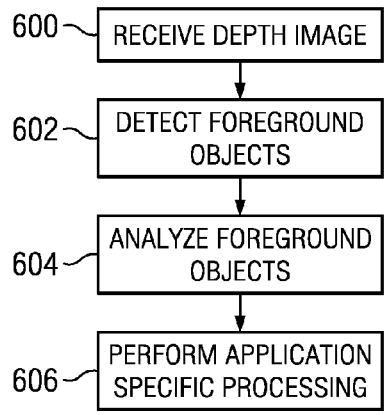
FIGS. 6 and 7 are flow diagrams of methods.

FIG. 6 is a flow diagram of a method for analysis of a depth image captured from a top-down perspective. The method may be performed in a digital video depth camera and/or in a computer system receiving a video sequence from a digital video depth camera. The method may be performed on each depth image in a video sequence. Initially, a depth image is received 600 and foreground objects are detected in the depth image 602. Any suitable technique for detecting foreground objects in a depth image may be used. In general, to detect objects, background subtraction is performed between the depth image and a depth background model of the scene under observation to generate a binary mask image. Morphological operations such as dilation and erosion may then be performed on the binary image to eliminate isolated pixels and small regions. Connected components analysis is then perform to extract individual blobs, i.e., sets of foreground pixels connected in the binary image. Some suitable techniques for detecting foreground objects in a depth image are described in C. Eveland, et al., "Background Modeling for Segmentation of Video-Rate Stereo Sequences," IEEE Computer Vision and Pattern Recognition, pp. 266-271, June 1998; M. Harville, et al., "Foreground Segmentation Using Adaptive Mixture Models in Color and Depth," IEEE Workshop on Detection and Recognition of Events in Video, pp. 3-11, July 2001; and J. Salas and C. Tomasi, "People Detection Using Color and Depth Images," Mexican Conference on Pattern Recognition, pp. 127-135, June 2011.

After the foreground objects are detected, the foreground objects are analyzed for data extraction and classification 604. For example, data extraction may be computing statistics of depth values in a foreground blob. For instance, a histogram of the depth values of the blob may be computed, which would reveal how pointy the object is (from a top-down perspective). Classifications may then be performed on the extracted data. For example, a shopping cart would have a different height histogram signature than a person. The data extraction and classification performed may be application specific. Examples of data extraction and classification that may be performed are described below. After the analysis of the foreground objects, application specific processing may be performed based on the analysis 606. Application specific processing may include, for example, storing the extracted data in a database (for business analysis), generating an alert or alarm based on the extracted data, etc.

Figure 7:
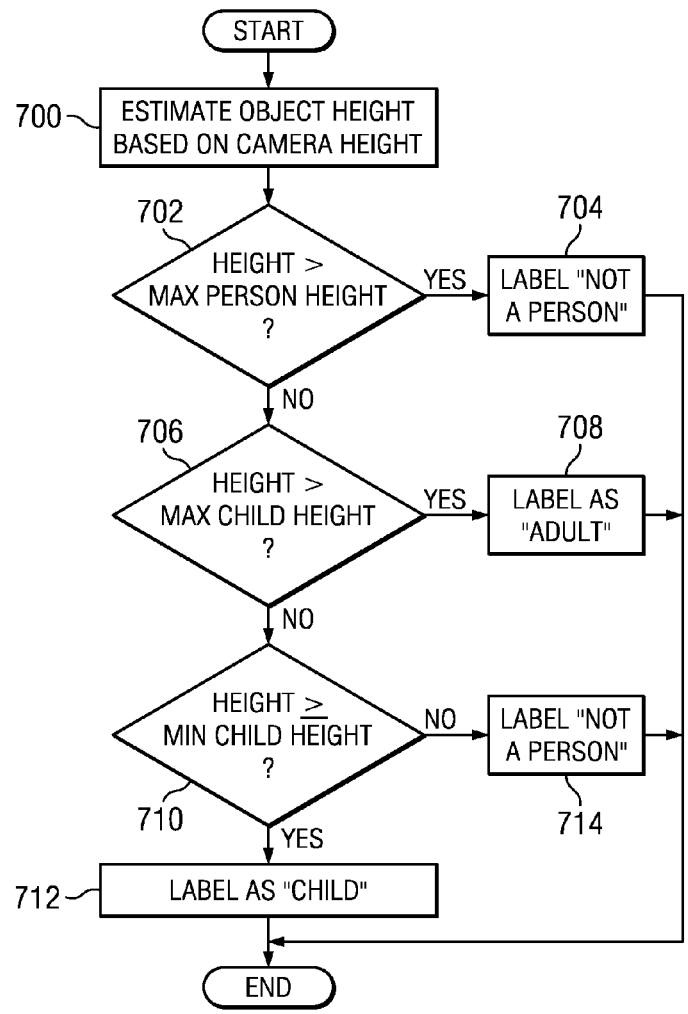

FIG. 7 is a flow diagram of a method for analyzing an identified foreground object based on height of the object. The method assumes that the height of the depth camera, H_cam, is known. For example purposes, the depth values are assumed to be metrically calibrated. Initially, the height of object is estimated based on the height of the depth camera 700. The height of the object may be estimated by finding the smallest depth value, d_min, of the pixels in the depth image corresponding to the blob representing the foreground object. Note that determining this minimum depth is another example of data extraction. The object height H_object may then be computed as $$H\_object = H\_cam - d\_min.$$

The object may then be classified as a child or an adult based on the estimated height by comparing the estimated height against population height characteristics, i.e., expected maximum and/or minimum heights of children and adults. More specifically, if the estimated height is greater than the maximum expected height of a person 702, e.g., 210 cm, the blob is labeled, i.e., classified, as "not a person" 704. Otherwise, if the estimated height is greater than the maximum expected height of a child 706, e.g., 120 cm, the blob is labeled as "adult" 708. If the estimated height is not greater than the maximum expected height of a child 706, the bob is labeled as "child" 712 if the estimated height is greater than or equal to the minimum expected height of a child 710, e.g., 70 cm. Otherwise, the estimated height of the object is not sufficient to be recognized as a child, and the blob is labeled "not a person" 714.

The above method is just one example of data extraction and classification that can be performed on foreground objects using depth information. The circumference of an object identified as a person can be estimated based on the 2D contour length of the blob. The estimated circumference may then be compared to expected circumference values and height values for a person similar to the method of FIG. 7 to estimate whether the person is overweight or not.

Wheelchairs may be identified in the scene by checking the height of an object against expected wheelchair heights and one or more prototypical height samples at representative points on wheelchairs. For example, if the height of a blob identified as "not a person" is approximately 100 cm, blob features may be compared to known wheelchair instances and/or models to determine if the object is a wheelchair.

Animals in a scene may be identified based on the estimated height of an object and the shape of the blob. That is, if the estimated height of an object is within an expected height range for an animal, e.g., between 30 cm and 60 cm, and the shape of the blob corresponds to an expected top-down shape for an animal, e.g., an elongated shape for cats and dog, the object may be labeled as "animal." The XY spatial configuration of the blob in the depth image reveals the 2D shape of the blob. Further, animals unaccompanied by a person may be detected by checking whether a person has been identified in proximity to the detected animal.

Shopping carts in a scene may be detected by applying height and rectangular blob-shape comparisons, i.e., comparisons based on the XY spatial shape of the blob, to classify blobs as "shopping cart." Similarly, the relative fullness of an identified shopping cart may be determined using a combination of the XY spatial shape of the blob with Z depth information for the blob. After a blob is classified as a shopping cart, depth values inside the blob may be checked to determine if the interior height is, for example, that of an empty shopping cart, a partially full shopping cart, or an over-the-top full shopping cart.

People holding hands may also be detected by analyzing the depth image for "arm connectivity" between two blobs identified as people, e.g., labeled as adults or children as in FIG. 7. For example, the depth images may be analyzed for the presence of a thin structure connecting the two blobs at an expected height.

People carrying items such as bags or backpacks may also be detected by examining the shape and height of a blob identified as a person with respect to the head of the person. If a person is carrying a bag, the corresponding blob would be expected to extent at about waist height either to the left or right of the torso. Similarly, the presence of a backpack would be expected to extend the corresponding blob toward the back upper portion of the torso. Motion of the blob over time may also be used to help identify the orientation of the person.

A person reaching up to a shelf or display may also be identified by analyzing the depth image for a thin structure or structures extending above the blob corresponding to the person.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:
1. A business intelligence system comprising:
means for capturing a depth image of a scene from a top-down perspective;

means for detecting a foreground object in the depth image; and means for performing data extraction and classification on the foreground object using depth information in the depth image, wherein the means for performing data extraction and classification classifies the foreground object based on the computed height and a 2D shape of the foreground object, and wherein the means for performing data extraction and classification computes a height of the foreground object based on a height of a depth camera used to capture the depth image.

2. The business intelligence system of claim 1, wherein the means for performing data extraction and classification uses both XY spatial shape of the foreground object in the depth image and depth information in the depth image.

3. The business intelligence system of claim 1, wherein the means for performing data extraction and classification computes the height of the foreground object by:

determining a smallest depth value of pixels in the depth image corresponding to the foreground object; and computing the height as a difference between the height of the depth camera and the smallest depth value.

4. The business intelligence system of claim 1, wherein the means for performing data extraction and classification classifies the foreground object as an adult or a child based on expected heights for an adult and a child.

5. The business intelligence system of claim 1, wherein the means for performing data extraction and classification classifies the foreground object as an animal when the computed height is within an expected height range for an animal and the 2D shape of the foreground object corresponds to an expected 2D shape for an animal.

6. The business intelligence system of claim 1, wherein the means for performing data extraction and classification classifies the foreground object as a shopping cart when the computed height is an expected height for a shopping cart and the 2D shape of the foreground object corresponds to an expected 2D shape for a shopping cart and determines fullness of the shopping cart based on depth values inside the foreground object.

* * * * *